US009635427B2

(12) United States Patent
St. John-Larkin et al.

(10) Patent No.: US 9,635,427 B2
(45) Date of Patent: *Apr. 25, 2017

(54) SYSTEMS AND METHODS FOR COMMUNICATIONS BETWEEN CLIENT DEVICES OF A BROADCAST SYSTEM

(71) Applicant: Echostar Technologies L.L.C., Englewood, CO (US)

(72) Inventors: David Christopher St. John-Larkin, Denver, CO (US); David A. Kummer, Highlands Ranch, CO (US); John Anthony Card, II, Denver, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,665

(22) Filed: Jan. 6, 2016

(65) Prior Publication Data

US 2016/0119680 A1 Apr. 28, 2016

Related U.S. Application Data

(63) Continuation of application No. 12/239,210, filed on Sep. 26, 2008.
(Continued)

(51) Int. Cl.
*H04N 7/173* (2011.01)
*H04N 21/4788* (2011.01)
(Continued)

(52) U.S. Cl.
CPC ..... *H04N 21/4788* (2013.01); *H04N 7/17318* (2013.01); *H04N 21/254* (2013.01);
(Continued)

(58) Field of Classification Search
CPC ........... H04N 21/44231; H04N 21/442; H04N 21/41407; H04N 21/4661; H04N 21/4668;
(Continued)

(56) References Cited

U.S. PATENT DOCUMENTS 5,892,536 A 4/1999 Logan et al.
6,081,830 A 6/2000 Schindler
(Continued)

FOREIGN PATENT DOCUMENTS

EP 1225763 A1 7/2002
EP 1515549 A1 3/2005
(Continued)

OTHER PUBLICATIONS

European Office Action mailed Dec. 2, 2015 for EP 08833657.3, 4 pages.
(Continued)

*Primary Examiner* — Pankaj Kumar
*Assistant Examiner* — Reuben M Brown
(74) *Attorney, Agent, or Firm* — Kilpatrick Townsend & Stockton LLP

(57) ABSTRACT

Systems and methods may provide for communication between a plurality of client devices of a broadcast system. The communication may be, for example, a recommendation of a program that is communicated from one subscriber to another subscriber or subscribers via their client devices. The communication also may be a comment regarding a program, for example, recently viewed at the client device of the one subscriber. In general, the communication may be a message from one subscriber to another subscriber or subscribers. Further, the communication may be configured to perform a function on one or more other client devices. Such a function may include, but is not limited to, setting a timer (Continued)

to record a program, ordering or purchasing a program or service, cancelling an ordered/purchased program or service, setting or altering user preferences, controlling access to channels, etc.

20 Claims, 3 Drawing Sheets

Related U.S. Application Data

(60) Provisional application No. 60/975,694, filed on Sep. 27, 2007.

(51) Int. Cl.

| | |
|---|---|
| H04N 21/254 | (2011.01) |
| H04N 21/466 | (2011.01) |
| H04N 21/472 | (2011.01) |
| H04N 21/482 | (2011.01) |
| H04N 21/2543 | (2011.01) |
| H04N 21/258 | (2011.01) |
| H04N 21/4147 | (2011.01) |
| H04N 21/458 | (2011.01) |
| H04N 21/488 | (2011.01) |
| H04N 21/6543 | (2011.01) |
| H04N 5/445 | (2011.01) |

(52) U.S. Cl.
CPC ... *H04N 21/2543* (2013.01); *H04N 21/25891* (2013.01); *H04N 21/4147* (2013.01); *H04N 21/458* (2013.01); *H04N 21/4661* (2013.01); *H04N 21/4668* (2013.01); *H04N 21/47214* (2013.01); *H04N 21/4826* (2013.01); *H04N 21/4882* (2013.01); *H04N 21/6543* (2013.01)

(58) Field of Classification Search
CPC ......... H04N 21/47214; H04N 21/4788; H04N 21/4826; H04N 21/4532; H04N 21/25808; H04N 21/25891; H04N 21/458; H04N 21/466; H04N 21/4662; H04N 21/4663; H04N 21/4665; H04N 21/4666; H04N 21/4667
USPC ................................................... 725/25, 46
See application file for complete search history.

(56) References Cited

U.S. PATENT DOCUMENTS

| | | | |
|---|---|---|---|
| 6,237,025 B1 | 5/2001 | Ludwig et al. | |
| 6,256,663 B1 | 7/2001 | Davis | |
| 6,392,664 B1 | 5/2002 | White et al. | |
| 6,519,771 B1 | 2/2003 | Zenith | |
| 6,646,673 B2 | 11/2003 | Caviedes et al. | |
| 6,754,904 B1 | 6/2004 | Cooper et al. | |
| 6,925,567 B1 | 8/2005 | Hirata | |
| 6,950,503 B2 | 9/2005 | Schwartz et al. | |
| 6,976,267 B1 * | 12/2005 | Takano | H04L 12/2854 |
| | | | 348/E5.108 |
| 7,590,429 B2 | 9/2009 | Hansen et al. | |
| 7,689,510 B2 | 3/2010 | Lamkin et al. | |
| 8,063,929 B2 | 11/2011 | Kurtz et al. | |
| 8,223,185 B2 | 7/2012 | Gratton et al. | |
| 8,896,654 B2 | 11/2014 | Gratton et al. | |
| 9,270,945 B2 | 2/2016 | St. John-Larkin et al. | |
| 2002/0144273 A1 | 10/2002 | Reto | |
| 2003/0065778 A1 | 4/2003 | Malik | |
| 2003/0126617 A1 | 7/2003 | Tewari et al. | |
| 2004/0148401 A1 | 7/2004 | Momonami | |
| 2004/0233239 A1 | 11/2004 | Lahdesmaki | |
| 2005/0108767 A1 | 5/2005 | Ma | |
| 2005/0130613 A1 | 6/2005 | Kutsuna et al. | |
| 2005/0246757 A1 | 11/2005 | Relan et al. | |
| 2005/0262542 A1 | 11/2005 | DeWeese et al. | |
| 2006/0109854 A1 | 5/2006 | Cancel | |
| 2006/0174312 A1 | 8/2006 | Ducheneaut et al. | |
| 2006/0179410 A1 | 8/2006 | Deeds | |
| 2006/0248557 A1 | 11/2006 | Stark et al. | |
| 2007/0033148 A1 | 2/2007 | Cahill | |
| 2007/0107019 A1 | 5/2007 | Romano et al. | |
| 2007/0130595 A1 | 6/2007 | McElhatten et al. | |
| 2007/0198738 A1 | 8/2007 | Angiolillo et al. | |
| 2007/0199038 A1 | 8/2007 | Choi | |
| 2008/0060001 A1 | 3/2008 | Logan et al. | |
| 2008/0092168 A1 | 4/2008 | Logan et al. | |
| 2009/0011743 A1 * | 1/2009 | Johanson | H04M 3/42068 |
| | | | 455/414.1 |
| 2009/0031381 A1 | 1/2009 | Cohen et al. | |
| 2009/0089855 A1 | 4/2009 | St. John-Larkin et al. | |
| 2009/0167839 A1 | 7/2009 | Ottmar | |
| 2009/0181702 A1 | 7/2009 | Vargas et al. | |
| 2009/0233542 A1 | 9/2009 | Gratton et al. | |
| 2011/0191799 A1 | 8/2011 | Raza | |
| 2012/0173957 A1 | 7/2012 | Humpleman et al. | |
| 2012/0254927 A1 | 10/2012 | Kim et al. | |
| 2012/0262535 A1 | 10/2012 | Gratton et al. | |
| 2013/0282824 A1 | 10/2013 | Galbreath et al. | |
| 2014/0215509 A1 | 7/2014 | Angiolillo et al. | |

FOREIGN PATENT DOCUMENTS

| | | |
|---|---|---|
| WO | 2007/078847 A2 | 7/2007 |
| WO | 2007/097963 A2 | 8/2007 |
| WO | 2007/105873 A1 | 9/2007 |
| WO | 2009/042879 A1 | 4/2009 |

OTHER PUBLICATIONS

Supplementary European Search Report for Application No. EP 08833657 mailed Mar. 30, 2011, 3 pages.
Extended European Search Report for EP 08833657.3 dated Apr. 8, 2011, 7 pages.
International Search Report and Written Opinion of PCT/US08/77880 mailed on Dec. 4, 2008, 8 pages.
International Preliminary Report on Patentability for PCT/US08/77880 issued Mar. 30, 2010, 6 pages.
U.S. Appl. No. 12/239,210, filed Sep. 26, 2008, Notice of Allowance mailed Oct. 7, 2015, 36 pages.
U.S. Appl. No. 12/239,210, filed Sep. 26, 2008, Notice of Allowance mailed Apr. 1, 2015, 24 pages.
U.S. Appl. No. 12/239,210, filed Sep. 26, 2008, Final Office Action mailed Aug. 31, 2012, 9 pages.
U.S. Appl. No. 12/239,210, filed Sep. 26, 2008, Office Action mailed Mar. 2, 2012, 8 pages.
U.S. Appl. No. 12/239,210, filed Sep. 26, 2008, Office Action mailed Sep. 20, 2011, 8 pages.
U.S. Appl. No. 12/239,210, filed Sep. 26, 2008, Office Action mailed Jun. 13, 2011, 8 pages.
U.S. Appl. No. 12/239,210, filed Sep. 26, 2008, Office Action mailed Dec. 13, 2010, 8 pages.
U.S. Appl. No. 12/239,210, filed Sep. 26, 2008, Office Action mailed Oct. 7, 2014, 34 pages.
U.S. Appl. No. 11/964,927, filed Dec. 27, 2007, Office Action mailed Apr. 25, 2012, 24 pages.
U.S. Appl. No. 11/964,927, filed Dec. 27, 2007, Final Office Action mailed Feb. 19, 2013, 17 pages.
U.S. Appl. No. 11/964,927, filed Dec. 27, 2007, Office Action mailed Sep. 21, 2012, 13 pages.
U.S. Appl. No. 11/964,927, filed Dec. 27, 2007, Office Action mailed Dec. 6, 2011, 21 pages.
U.S. Appl. No. 12/046,619, filed Mar. 12, 2008, Notice of Allowance mailed Mar. 16, 2012, 5 pages.
U.S. Appl. No. 12/046,619, filed Mar. 12, 2008, Office Action mailed Dec. 6, 2011, 6 pages.

* cited by examiner

SYSTEMS AND METHODS FOR COMMUNICATIONS BETWEEN CLIENT DEVICES OF A BROADCAST SYSTEM

CROSS REFERENCE TO RELATED APPLICATIONS

The present application is a continuation of U.S. Nonprovisional patent application Ser. No. 12/239,210, which was filed on Sep. 26, 2008, and entitled "Systems and Methods for Communications Between Client Devices of a Broadcast System," which claims the benefit under 35 U.S.C. §119(e) to U.S. Provisional Patent Application No. 60/975,694, which was filed on Sep. 27, 2007, and entitled "Systems and Methods for Communications Between Client Devices of a Broadcast System," which are both incorporated by reference into the present application in their entirety.

TECHNICAL FIELD

The inventive field relates generally to communication between client devices, such as set top boxes (STB), satellite receivers, digital video recorders (DVR) or similar devices. The inventive field also relates to interconnecting a plurality of client devices, for example, by defining communication protocols for communications between the client devices.

BACKGROUND DISCUSSION

The proliferation of subscription television programming, the increasing number of available channels, and the corresponding increase in television programming have led to continued development of onscreen program directories and guides. This has also lead to continued development of other user interactive features, such as the ability to set timers to record programs, the ability to set user preferences, for example, for how information is displayed, and the ability to lock or otherwise control access to channels.

Recent developments include the expansion of such features to include remote task scheduling via the Internet. Such approaches typically allow a subscriber of television services to interact with their client device remotely via a website that provides various functions to permit the subscriber to instruct their client device to perform certain activities, such as setting a timer to record a program or initiating recording based on an instruction scheduled through the website. In general, such approaches aim to allow the subscriber to perform various functions remotely that are conventionally performed by the subscriber directly using the client device.

Conventional client devices are configured to receive programs and program information from one or more sources, generally referred to as the service provider or broadcast service. The programs and the program information may be provided to the client device via one or more communication channels. For example, in a cable broadcast system, the programs and the program information may be provided to the client device via a coaxial cable connected to an input of the client device. In a satellite broadcast system, the programs and the program information may be provided to the client device via a satellite dish that is connected to an input of the client device via a coaxial cable. Alternatively or additionally, the program information may be provided to the client device via a telephone line connected to another input of the client device. The connection to the telephone line may also provide a communication channel for feedback to the service provider, for example, regarding programs viewed via the client device, and/or for allowing pay programs to be ordered or purchased using the client device.

SUMMARY

Conventional client devices are not configured to communicate or otherwise interact with other client devices of a broadcast system. The only communications provided by the client devices are with the service provider. Such communication or interaction between client devices of a broadcast system may be beneficial. For example, communications between client devices may increase user satisfaction and/or enjoyment of broadcast services, in a manner other than by increasing the available program content. Thus, there is a need to provide systems and methods for establishing communications between client devices of a broadcast system.

Various embodiments relate to systems and methods that provide communication between a plurality of client devices of a broadcast system. The communication may be, for example, a recommendation of a program that is communicated from one subscriber to another subscriber or subscribers via their client devices. The communication also may be a comment regarding a program, for example, recently viewed at the client device of the one subscriber. In general, the communication may be a message from one subscriber to another subscriber or subscribers, or any sort of shared content.

Some embodiments may involve a communication initiated by one client device that is configured to perform a function on one or more other client devices. Such a function may include, but is not limited to, setting a timer to record a program, ordering or purchasing a program or service, cancelling an ordered/purchased program or service, setting or altering user preferences, controlling access to channels, etc.

For example, some embodiments may involve a communication from one client device that sets a timer to record a program on one or more other client devices. The communication may be in the form of a request for permission to set the timer. The one or more other client devices may be preset to provide permission for the one client device to set timers, or user interaction may be required at the one or more other client devices to provide permission for the one client device to set timers. The preset permission may have any of various restrictions, such as, non-overwriting of recorded content, free disk space requirements, etc.

Various embodiments relate to systems and methods that provide communication protocols for communication between a plurality of client devices of a broadcast system. The communication protocols may facilitate and/or regulate communications between the client devices. For example, each client device may be set by a user to allow communications from other client devices or from a specified client device and/or to allow only certain types of communications from other client devices or from a specified client device. Additionally or alternatively, each client device may be set by a user to allow communications from other client devices or from a specified client device either conditionally or unconditionally.

The communication protocols may involve a user registering his client device for a particular service. For example, the user may subscribe or otherwise belong to a specified group or groups of client devices. Each group may be, for example, related to a specific interest, such as a particular program series, a particular program type, theme or genre, a particular actor, director or producer, a particular channel, etc. Alternatively or additionally, each group may be structured to grant permission(s) to the user of a client device belonging to the group, for example, to establish certain types of communications with other client devices of the group.

The communication protocols may involve searching a list of users of client devices. For example, a user of a client device may initiate a communication to other client devices of the broadcast system. The communication protocol may search the list of users for client devices that accept, either conditionally or unconditionally, such a communication. For the client devices that unconditionally accept such a communication, the communication protocol may provide the communication to the client devices. For the client devices that conditionally accept such a communication, the communication protocol may provide a notification of the proposed communication to the client devices, thus allowing the client devices to accept or reject the proposed communication.

By using various embodiments, communications and/or communication protocols for communications between client devices of a broadcast system may enhance the functionality and/or user interactivity of the client devices.

BRIEF DESCRIPTION OF THE DRAWINGS

Various details of the present invention may be better understood on reading the following detailed description of non-limiting embodiments, and on examining the accompanying drawings, in which.

DETAILED DESCRIPTION OF EMBODIMENTS

Figure 1:
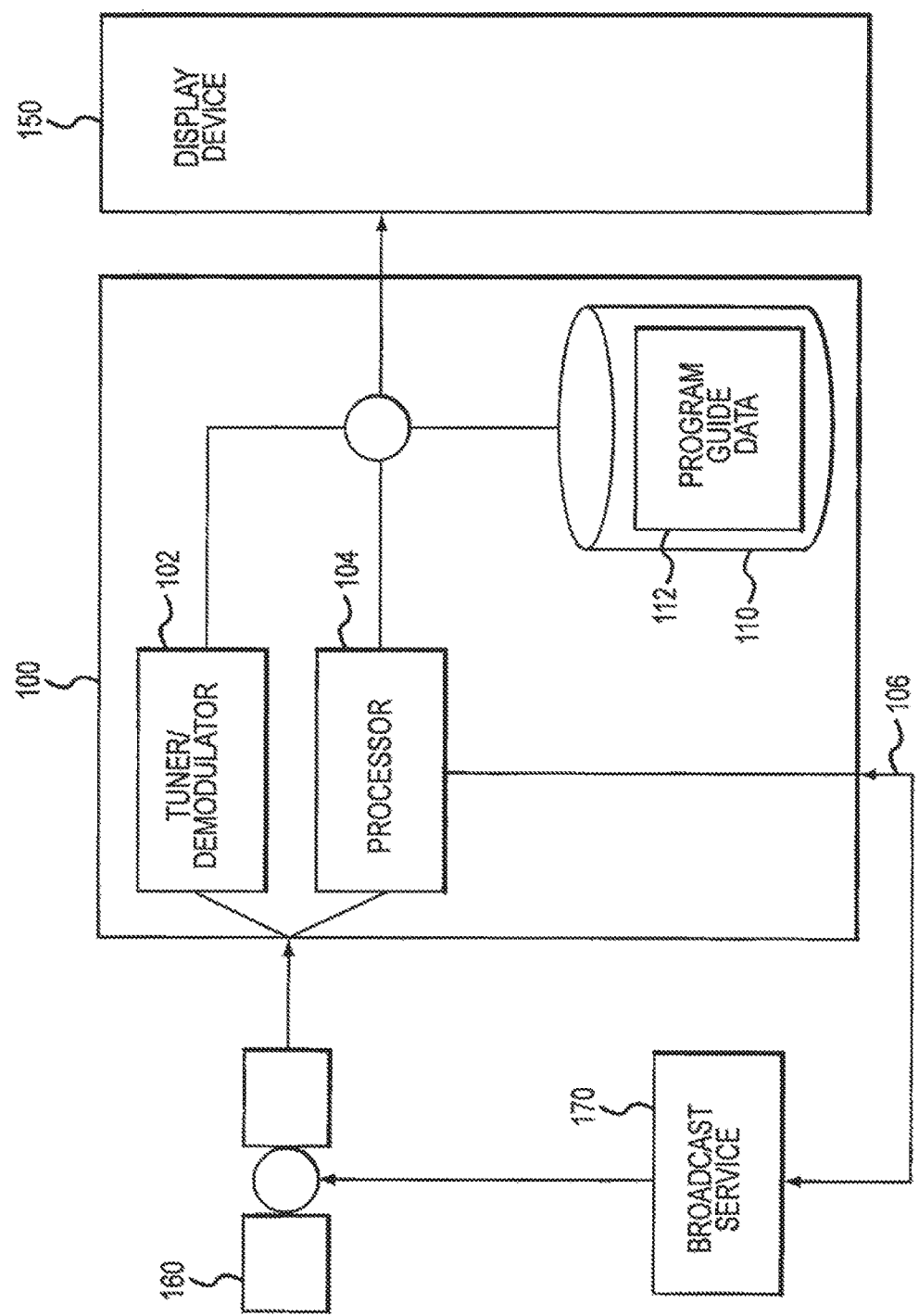
FIG. 1 is a simplified block diagram illustrating components of an example of a broadcast satellite television system.

As used herein, the term "client device" is intended to encompass a device that is configured to receive programs and program information from a broadcast source (e.g., satellite, cable, Internet, etc.) and to display the programs and the program information on a display device, such as a television or a monitor. Although not restricted to a particular implementation, the term "client device" is intended to encompass set top boxes, satellite receivers, digital video recorders, and the like. The client devices described herein may be considered to be embodied in software and/or hardware that facilitates the reception and display of programs and program information from a broadcast source.

The embodiments shown in the Figures illustrate systems and methods that may allow client devices of a broadcast system to communicate with each other. The illustrated systems and methods provide examples of how communication between a plurality of client devices of a broadcast system may be implemented. However, it should be understood that other implementations are possible and contemplated. Also, it should be understood that reference herein to a communication from one client device to another client device, or from a first client device to a second client device, may equally apply to a communication from one client device to a plurality of other client devices.

Communications between client devices may be desirable for many reasons. For example, a user of a client device may wish to communicate with a user of another client device regarding a program provided to the client devices by the broadcast source of the broadcast system. The users of the client devices may be, for example, subscribers of the broadcast system. The user of the client device may wish to communicate via the client devices as the communication relates to use of the client devices. Thus, the user of the client device may conveniently communicate using the client device while in the mode of operating the client device.

For example, the user of a first client device may be viewing a program schedule and wish to communicate something about a program listed on the schedule. Also, the user of the first client device may be viewing or have just finished viewing a program and wish to communicate something about that program. As the user of the first client device is currently using the first client device, the first client device may provide a more convenient way of communicating to the user of a second client device than, for example, calling the user by telephone. Further, by communicating via the client devices, the user of the second client device need not be available, for example, to answer the telephone or to retrieve a telephone message. Rather, the user of the second client device may receive or retrieve the communication when operating the second client device, thus being provided with the communication when the communication is particularly relevant and/or convenient to the user of the second client device.

The communication from one client device to another client device of the broadcast system may be any desired communication from the user. In particular, it is contemplated that the communication may comprise information, such as a recommendation, a suggestion, a comment or other message, and/or may comprise instructions for a client device to perform a function or operation. Various functions or operations that may be performed by the client device(s) in response to receiving a communication may include, but are not limited to, setting a timer to record a program, ordering or purchasing a program or service, cancelling an ordered/purchased program or service, setting or altering user preferences, controlling access to channels, etc. In general, any function or operation that may be performed by a client device may be instructed by the communication.

For example, a communication from a first client device may be configured to set a timer to record a program on a second client device. The communication may require permission from the second client device to set the timer. Thus, the communication may be in the form of a request for permission to set the timer. The user of the second client device may input a command to the second client device indicating whether or not he grants permission for the timer to be set. In other words, the user of the second client device may be allowed to accept or reject the communication.

Alternatively, the user of the second client device may preset the second client device to provide permission for the first client device to set timers. For example, if the user of the second client device trusts the particular user or otherwise wishes the particular user to have access to set timers on the second client device, the second client device may be set to recognize the first client device as authorized to set timers. Such preset or authorization may be unconditional, but also may be conditional, for example, allowing the first client device to set a limited number of timers, to set timers to a limited selection of channels, to set timers based on an amount of storage space currently available for the recording on the second client device or based on a preset limit of storage space allotted to recordings of programs by timers set by the first client device.

As noted above, the function or operation that may be instructed by the communication may be any function or operation that may be performed by a client device. Thus, some embodiments may involve a communication that results in a similar or an identical behavior by the second client device as if the second client device had received the instruction(s) locally, for example, via a handheld remote control or a control panel of the second client device. As such, a technician may use the first client device to trouble-shoot and/or correct problems that the second client device may experience. In particular, some embodiments may involve a communication that results in a display by the second client device that is controlled in response to the communication from the first client device. As such, the user of the second client device may assist the technician, as appropriate or desired. Also, the communication from the first client device may provide the user of the second client device with a tutorial for a particular function or operation, such as setting a timer to record a program, setting a user preference, navigating menus, etc.

Allowing a user of a first client device to perform a function or operation on a second client device may conveniently set up or operate the second client device. For example, the first client device may be installed in the same or a different household than the second client device. When in the same household, the communication may allow the user to interact with the second client device via the first client device, and vice versa. Thus, the user need not interact with the first and second client devices separately, but may individually or collectively set up or operate both client devices from one location. This may be particularly convenient, for example, to allow the user to set different timers for the different client devices without having to go to the location of each client device. Similarly, when in different households, the first client device may be used to remotely set up or operate the second client device. This may be particularly convenient, for example, to allow the user to control the second client device without having to go to the other household.

It should be understood that suitable communication protocols for communication between a plurality of client devices of a broadcast system are also contemplated. In general, the communication protocols may facilitate and/or regulate communications between the client devices. For example, each client device may be set by a user to allow communications from other client devices or from a specified client device and/or to allow only certain types of communications from other client devices or from a specified client device. Additionally or alternatively, each client device may be set by a user to allow communications from other client devices or from a specified client device either conditionally or unconditionally.

Communications between the client devices may be restricted and/or routed according to suitable communication protocols. For example, the communication protocols may involve a user registering his client device for a particular service. The service may associate the particular client device with a "mailing list" or "group" of client devices also registered with the service. Thus, a communication may be identified or otherwise intended to be received by subscribers to the service, such that the particular client device and all other client devices registered with the service may receive the communication.

As an example, a user may register a particular client device with a movie information service. The service may then provide communications that provide information, such as reviews, recommendations, release dates, etc., and/or that are configured to set timers to record movies scheduled to be broadcast by the broadcasts system.

As another example, the user may subscribe or otherwise belong to a specified group or groups of client devices. Each group may be, for example, related to a specific interest, such as a particular program series, a particular program type, theme or genre, a particular actor, director or producer, a particular channel, etc. Each group may thus facilitate communications between users of client devices with common interests.

As a member of a group, each client device may be allowed to communicate with the client devices of other members of the group, for example, by having the client devices of members of the group set or otherwise configured to accept communications from the client devices of other members of the group. Alternatively or additionally, each client device may be configured to communicate with the client devices of the group members without having to specify each member's client device. It should be understood that any structure or hierarchy within the group may be established, as appropriate or desired. For example, selected members may be granted different permission(s) to communicate with the other members, for example, based on a type of communication to be provided.

With or without the use of groups including client devices, the communication protocols may involve searching a list of users of client devices. The search may be based on, for example, the user preferences and/or profiles set on the client devices. The user preferences of a client device may be set, for example, not to receive communications, to receive communications only of a certain type (e.g., information, function or operation, etc.), to receive communications only from a particular client device(s), and/or to require user interaction to accept all communications, communications of a certain type and/or communications from a particular client device(s). The user profile of a client device may set, for example, particular topics of communications that the client device is to receive to meet the user's interests.

It should be understood that various implementations are possible. For example, satellite, cable, internet or other broadcasting technologies may be suitable. Thus, while the following description provides an example in the context of a satellite broadcast system, it should be understood that such description is not limiting.

Figure 2:
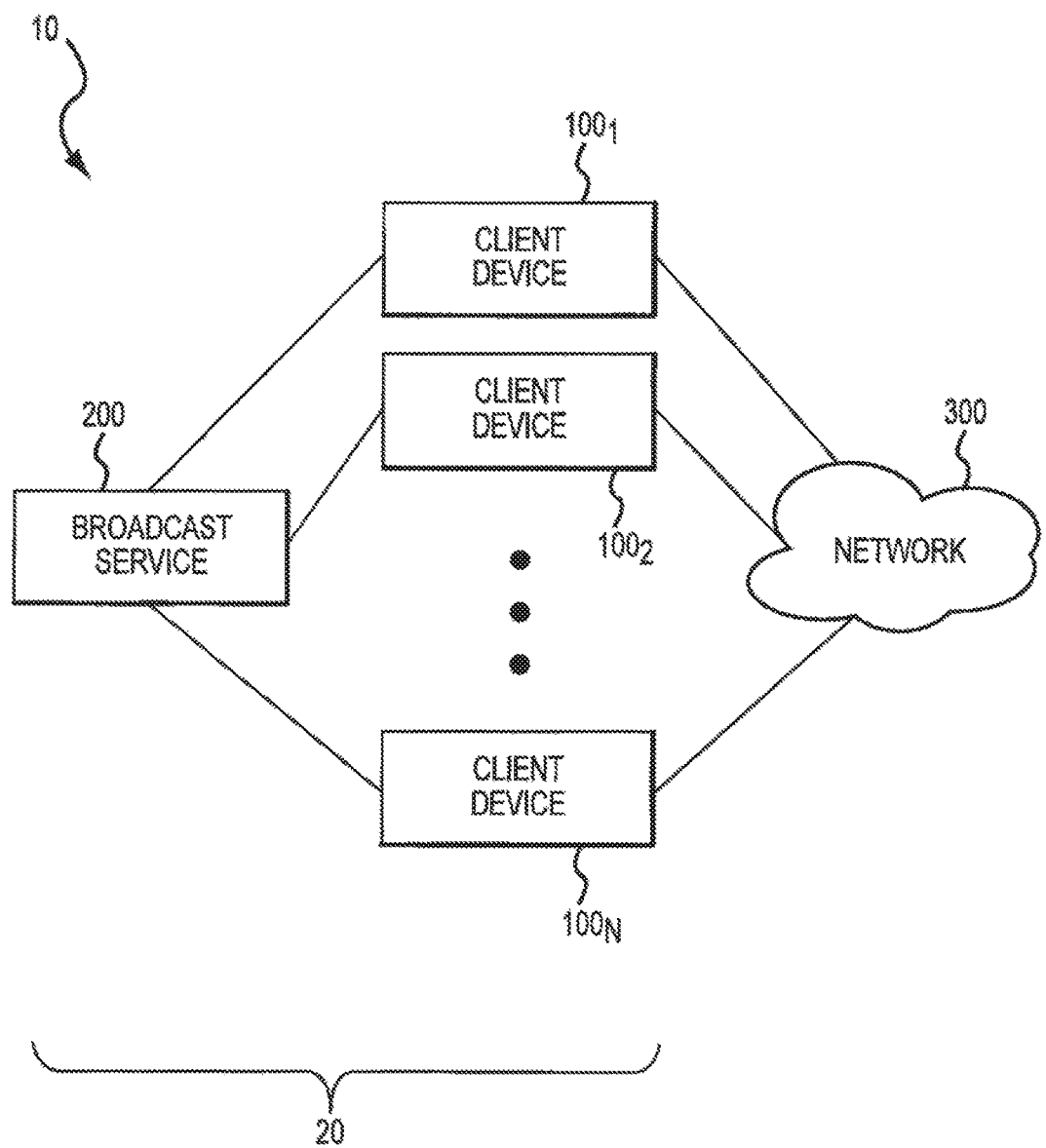
FIG. 2 is a simplified block diagram illustrating a system for providing communication between client devices of a broadcast system.
Figure 3:
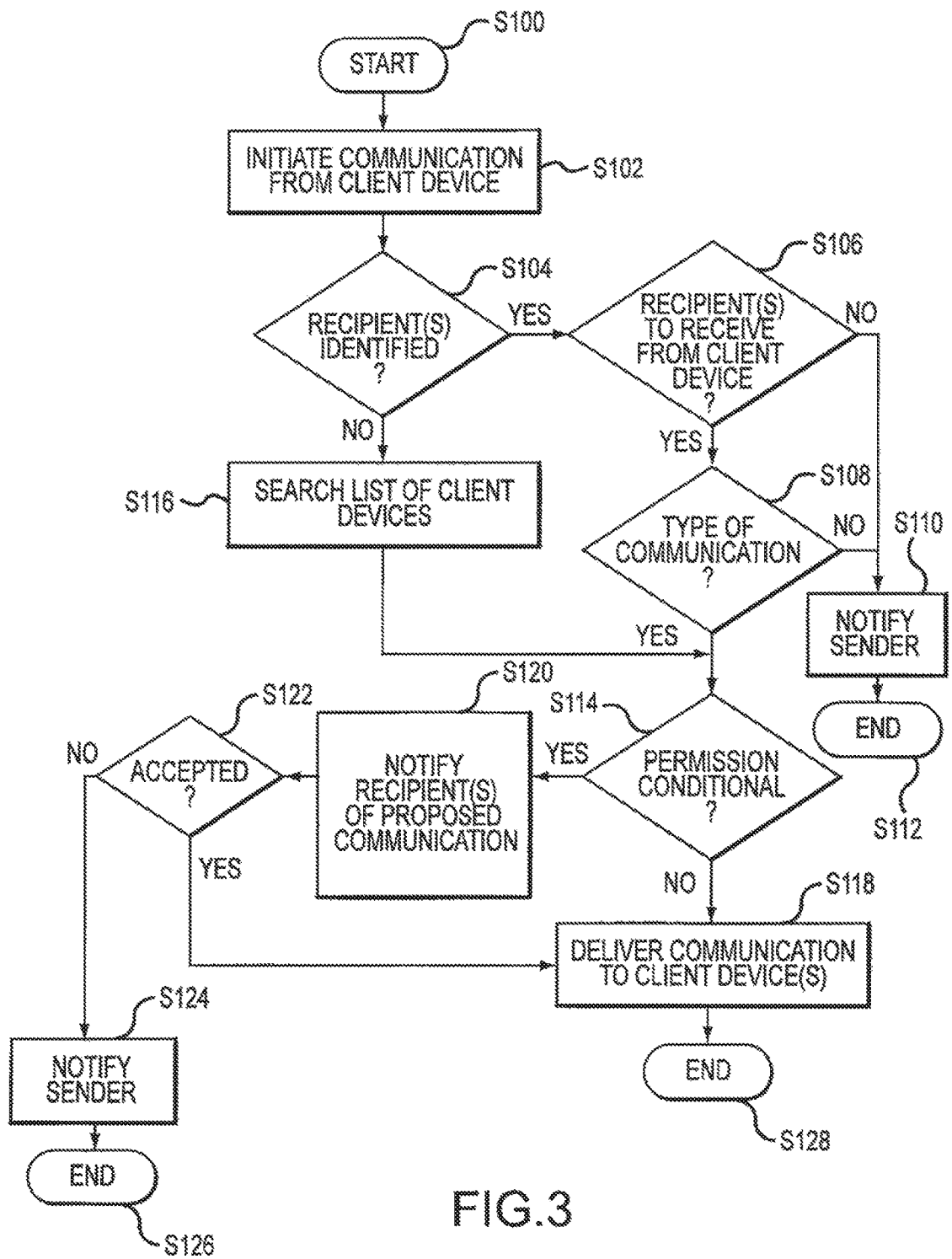
FIG. 3 is a flowchart illustrating an example of operations associated with a communication protocol for a communication from one client device to one or more other client devices of a broadcast system.

The block diagrams shown in FIGS. 1 and 2 and the flowchart shown in FIG. 3 are for illustration only and are not intended to represent the only possible process flows and system configurations. In particular, it should be understood that operations may be added, omitted and reordered as may be suitable to a particular application. Also, individual components may be added, omitted, replaced and interrelated as may be suitable to a particular application. All details appurtenant to implementing the exemplary systems and methods that are well understood in the art are omitted for simplicity and clarity.

FIG. 1 is a simplified block diagram illustrating components of an example of a broadcast satellite television system that may be used to implement various features described herein. In particular, FIG. 1 generally illustrates a client device 100 as part of a satellite broadcast system. In this example, a broadcast service 170 provides programs and program information, via one or more satellites 160, to the client device 100. The client device 100 may include suitable circuitry, other hardware and/or software to receive a signal(s) from the satellite(s) 160, such as a satellite dish or antenna (not shown).

The signal(s) from the satellite(s) 160 may carry multiple channels of programs, program information (such as electronic programming guide data), and/or other information, such as conditional access data. The signal(s) from the satellite(s) 160 received at the client device 100 may be processed such that the data and/or the channels may be viewed on a display device 150, such as a television set or monitor.

The client device 100 may include a tuner unit 102, which may comprise a tuner, a demodulator, and any other device or circuitry for selecting channels and modifying the data format for processing and/or displaying on the display device 150. The client device 100 may also include a processor 104 for controlling various operations of the client device 100 and/or the other components thereof.

The client device 100 may also include a storage device 110, which may have a program and/or associated data stored thereon, in addition or alternatively to such program and/or data rendered on the display device 150.

The storage device 110 may also be used to store program guide data 112. The program guide data 112 may be included in the broadcast of the satellite(s) 160, but may also be received through another connection 106, for example, a dial-up connection through a network such as the public telephone network or the internet. The storage device 110 may also be used to store a user profile or user preferences, usually specific to the client device 100.

Program guide data 112 typically includes information about the programs and channels being broadcast by the satellite 160, and may include, but is not limited to, program start times, program end times, program durations, program ratings, program reviews, program descriptions, program titles, program show dates, and the like. The program guide data 112 may also serve as a schedule for programs that will be broadcast in the future.

Regardless of the particular implementation of the client device 100 and/or the broadcasts system in general, a system for providing communication between client devices of a broadcast system is contemplated. FIG. 2 is a simplified block diagram illustrating an example of such a system 10 for providing communication between client devices of a broadcast system 20. The broadcast system 20 may generally include a broadcast service 200, such as a cable or satellite system, and a plurality of client devices $100_1$, $100_2$, ... $100_N$ that are configured to receive programs and program information from the broadcast service 200 and to provide data for display on a respective display device (not shown).

Each of the client devices $100_1$, $100_2$, ... $100_N$ may also be interconnected via a network 300 that allows the client devices $100_1$, $100_2$, ... $100_N$ to communicate with one another. The network 300 may be any suitable network, either wired or wireless, such as the public telephone network or the internet, or any other network known or hereafter developed, that allows communication between the client devices $100_1$, $100_2$, ... $100_N$.

For example, the client devices $100_1$, $100_2$, ... $100_N$ may each include a connection port or interface that links the client devices $100_1$, $100_2$, ... $100_N$ to the network 300. By providing a separate communication link via the network 300, the system 10 may avoid any interference with normal broadcast operations of the broadcast system 20. However, a two-way satellite system may allow communications between the client devices $100_1$, $100_2$, ... $100_N$ as well. Such a two-way satellite system may either emulate an arbitrary "network" (e.g., DSL, etc.) for a "backchannel", or may provide specific capabilities that only enable device-to-device communication. Such a network may be entirely contained within (implemented by) on a home DBS distribution system (e.g., coaxial wiring), may employ an existing home network (e.g., powerline, Ethernet, wireless 802.11, etc.), may use telephony or cell phone systems, or may implement an arbitrary protocol over a different media (e.g., powerline point-to-point, wireless, etc.).

In general, four scenarios may be envisioned. The primary network of the broadcast service may provide client device-to-client device communications directly to client devices. A second communication network (e.g., backchannel) may provide client device-to-client device communications. A first client device may use such a second communication network to transmit the communication to the broadcast service, and the broadcast service may transmit the communication to a second client device via its primary network or broadcast channel, for example, using an ID of the second client device. The first client device may use the second communication network to transmit the communication to the broadcast service, and the broadcast service may transmit the communication to the second client device via the second network. In some embodiments, an existing "backchannel" of known client devices may be used.

As should be understood from FIG. 2, various communications, such as those discussed above, between the client devices $100_1$, $100_2$, ... $100_N$ may be carried out using the illustrative system 10. Such communications may allow client devices $100_1$, $100_2$, ... $100_N$ to share any desired data or information, such as settings, streamed content, downloaded content files, user presence, user interaction, user intent, etc.

As an example, FIG. 3 shows a flowchart illustrating a method for a communication from one client device to one or more other client devices of a broadcast system. It should be understood that various other methods and/or communication protocols may be implemented, as appropriate or desired, based on the desired communications between client devices. Thus, it should be understood that the details discussed above with respect to the communications contemplated between client devices are sufficient to be implemented in appropriate methods and/or communication protocols other than that illustrated in FIG. 3.

Operation may begin at S100, and continue to S102, where a communication may be initiated from a client device. Once the communication is initiated from the client device, operation may continue to S104, where a determination may be made as to whether a recipient for the communication is identified. The recipient(s) may be one or more other client devices, and may be identified in any suitable manner. For example, client devices may be identified individually by a unique identifier or code. Alternatively or additionally, client devices may be identified collectively a members of a mailing list or group. Such groupings may be defined by the system, for example, for users of the client devices to join. However, this is not to exclude the possibility of user defined groups, including but not limited to, personal mailing lists, such as contacts that may be stored locally on a client device.

If the intended recipient for the communication is identified, operation may continue to S106, where a determination may be made as to whether the intended recipient(s)

is/are configured to receive communications from the client device. As discussed above, each client device may be configured or set to allow communications from particular client devices or groups of client devices. If the communication to the intended recipient(s) is allowed, operation may continue to S108, where a determination may be made as to whether the intended recipient(s) is/are configured to receive the particular type of communication, either generally or from the particular client device. As such, it should be understood that the operations at S106 and S108 may be reordered, combined, or otherwise modified, as appropriate or desired, to evaluate whether a particular communication may be received by a client device.

If at S106 or at S108, the determination is that the communication may not be received by the intended recipient(s), then operation may optionally continue to S110, where the client device that initiated the communication may be notified that the communication was not delivered. Alternatively or additionally, the client device may be provided with additional information, such as the identity of the intended recipient(s) to which the communication was not delivered and/or the reason(s) for non-delivery. Operation may then end at S112.

Returning to S104, if the intended recipient for the communication is not identified, operation may continue to S116, where a search of a list of client devices may be made. For example, as discussed above, the search may be directed to identifying client devices to which the communication may be of interest. In particular, the search may include a list of groups of client devices. As also discussed above, the search may be based on user preferences and/or user profiles associated with the client devices. If no client devices are identified by the search, then, although not illustrated, operation may continue to notify the client device that initiated the communication and then end.

Also, although not illustrated, it should be understood that the search performed at S116 may include an evaluation or evaluations similar to that of S106 and/or S108. Thus, the operations of notification and ending may similarly result from S116.

Assuming that at least one client device is identified as a permitted recipient for the communication at S116, or if the communication is determined to be permitted (i.e., the intended recipient(s) is/are determined to be configured to receive the communication from the client device) at S106 and S108, then operation may continue to S114, where a determination may be made as to whether the permission for receiving the communication is conditional. If the permission is conditional, operation may continue to S120, where the intended recipient(s) may be notified of the communication. For example, each intended recipient (client device) may display a message to the user or otherwise provide an option to the user to accept or reject the proposed communication. Thus, the permission may be generally conditional and require user interaction for the communication to proceed.

It should be understood that specific conditions may be imposed on the intended communication for a given client device. Such other conditions are generally unlimited, and may be any useful criteria for determining whether a communication should be accepted or rejected. It should also be understood that specific conditions may also require user interaction for the communication to proceed, but may involve an automatic acceptance if the condition is satisfied. In such case, the operation at S120 may be omitted.

Regardless of the need for user interaction, operation may continue to S122, where a determination may be made as to whether the proposed communication is accepted, for example, by a user input or by an automatic operation. If not accepted, then operation may optionally continue to S124, where the client device that initiated the communication may be notified that the communication was not accepted. Operation may then end at S126.

If the permission is determined not to be conditional at S114, or if the condition is determined to be satisfied so that the communication is accepted at S122, then operation may continue to S118, where the communication may be delivered to one or more of the intended client device(s). Once the communication is delivered, operation may end at S128.

Although not illustrated, it should be understood that various forms of delivery may be implemented, such as an audible and/or visual notification on the display device of the client device receiving the communication, an overlay of the message on a current display of the display device, storage of the message at the client device for later retrieval by the user, etc. In particular, the nature of the delivery of the communication may be configured to suit the particular user of the client device, for example, via user preferences set for the client device.

Further, although not shown for the sake of clarity and simplicity, it should be understood that other features described above may be incorporated in the method. Accordingly, the method shown in the flowchart of FIG. 3 should be understood as being illustrative only and not limiting.

Although various details have been described herein with reference to particular embodiments, it is to be understood that these embodiments are merely illustrative of principles and applications. It is therefore to be understood that numerous modifications may be made to the illustrative embodiments and that other arrangements may be devised without departing from the spirit and scope of this disclosure.

What is claimed is:

1. A method for communicating between multiple client devices of a television broadcast system, the method comprising:
   receiving a communication from a first client device, wherein the first client device is configured to receive video signals from a television broadcast system;
   evaluating a user profile associated with a second client device to determine if the second client device will accept the communication, the user profile including user defined settings to accept or not accept each of:
      a message from the first client device, wherein when the message is received, the message is displayable on a display device associated with the second client device, and wherein the displayed message provides a tutorial for setting a program recording timer, and
      a functional instruction from the first client device, the functional instruction executable by the second client device to cause the second client device to record program content;
   determining that the second client device will accept the communication; and
   transmitting the communication to the second client device;
   wherein the communication is configured to cause the second client device to take at least one of the following actions:
      cause the message to display on the display device associated with the second client device; or
      execute the functional instruction to cause the second client device to record program content.

2. The method of claim 1, wherein causing the message to display comprises displaying a notification that a message has been received prior to display of the message on display device associated with the second client device.

3. The method of claim 2, wherein the notification displayed on the display device associated with the second client device comprises a request for permission to display the communication on the display device associated with the second client device, and wherein the communication is displayed on the display device associated with the second client device when permission is granted by the second client device.

4. The method of claim 1, wherein the user profile further comprises user defined settings to accept or not accept:
a direction to purchase a program for viewing via the second client device.

5. The method of claim 1, wherein the user profile further comprises user defined settings to accept or not accept:
a direction to alter a user preference for the second client device.

6. The method of claim 1, wherein the user profile further comprises user defined settings to accept or not accept:
a direction controlling access to channels by the second client device.

7. The method of claim 1, wherein causing the second client device to record program content comprises setting a timer to record a program on the second client device.

8. The method of claim 1, further comprising:
transmitting the communication to one or more additional client devices, wherein transmitting the communication to one or more additional client devices includes searching a list of client devices, determining which client devices accept the communication, and transmitting the communication to the client devices determined to accept the communication.

9. A television receiver, comprising:
one or more processors;
a wireless transceiver communicatively coupled to the one or more processors;
a non-transitory computer readable storage medium communicatively coupled to the one or more processors, wherein the non-transitory computer readable storage medium includes instructions that, when executed by the one or more processors, cause the one or more processors to perform operations including:
receiving a communication from a first client device, wherein the first client device is configured to receive video signals from a television broadcast system;
evaluating a user profile associated with a second client device to determine if the second client device will accept the communication, the user profile including user defined settings to accept or not accept each of:
a message from the first client device, wherein when the message is received, the message is displayable on a display device associated with the second client device, and wherein the displayed message provides a tutorial for setting a program recording timer, and
a functional instruction from the first client device, the functional instruction executable by the second client device to cause the second client device to record program content;
determining that the second client device will accept the communication; and
transmitting the communication to the second client device;
wherein the communication is configured to cause the second client device to take at least one of the following actions:
cause the message to display on the display device associated with the second client device; or
execute the functional instruction to cause the second client device to record program content.

10. The television receiver of claim 9, wherein causing the message to display comprises displaying a notification that a message has been received prior to display of the message on display device associated with the second client device.

11. The television receiver of claim 10, wherein the notification displayed on the display device associated with the second client device comprises a request for permission to display the communication on the display device associated with the second client device, and wherein the communication is displayed on the display device associated with the second client device when permission is granted by the second client device.

12. The television receiver of claim 9, wherein the user profile further comprises user defined settings to accept or not accept:
a direction to purchase a program for viewing via the second client device.

13. The television receiver of claim 9, wherein the user profile further comprises user defined settings to accept or not accept:
a direction to alter a user preference for the second client device.

14. The television receiver of claim 9, wherein the user profile further comprises user defined settings to accept or not accept:
a direction controlling access to channels by the second client device.

15. The television receiver of claim 9, wherein causing the second client device to record program content comprises setting a timer to record a program on the second client device.

16. The television receiver of claim 9, wherein the operations further include:
transmitting the communication to one or more additional client devices, wherein transmitting the communication to one or more additional client devices includes searching a list of client devices, determining which client devices accept the communication, and transmitting the communication to the client devices determined to accept the communication.

17. A system for communications between television receiver devices of a television broadcast system, the system comprising:
receiving a communication from a first client device, wherein the first client device is configured to receive video signals from a television broadcast system;
evaluating a user profile associated with a second client device to determine if the second client device will accept the communication, the user profile including user defined settings to accept or not accept each of:
a message from the first client device, wherein when the message is received, the message is displayable on a display device associated with the second client device, and wherein the displayed message provides a tutorial for setting a program recording timer, and
a functional instruction from the first client device, the functional instruction executable by the second client device to cause the second client device to record program content;

determining that the second client device will accept the communication; and transmitting the communication to the second client device;

wherein the communication is configured to cause the second client device to take at least one of the following actions:

cause the message to display on the display device associated with the second client device; or execute the functional instruction to cause the second client device to record program content.

18. The system of claim 17, wherein causing the message to display comprises displaying a notification that a message has been received prior to display of the message on display device associated with the second client device.

19. The system of claim 18, wherein the notification displayed on the display device associated with the second client device comprises a request for permission to display the communication on the display device associated with the second client device, and wherein the communication is displayed on the display device associated with the second client device when permission is granted by the second client device.

20. The system of claim 17, wherein causing the second client device to record program content comprises setting a timer to record a program on the second client device.

\* \* \* \* \*